United States Patent [19]

Pedersen

[11] 3,943,589
[45] Mar. 16, 1976

[54] GANGWAY ELEMENT

[76] Inventor: Peder Fahrsen Pedersen, Novling pr. Skibbild, 7400 Herning, Denmark

[22] Filed: Nov. 5, 1974

[21] Appl. No.: 521,087

[52] U.S. Cl. ................. 14/72 R; 404/19; 52/180; 14/73
[51] Int. Cl.² ........................................ E01D 15/12
[58] Field of Search ....... 14/73, 72; 52/180; 404/19, 404/20, 34

[56] References Cited
UNITED STATES PATENTS

| | | | |
|---|---|---|---|
| 2,281,822 | 5/1942 | Bills | 52/180 |
| 2,326,963 | 8/1943 | Morton | 52/180 |
| 2,421,171 | 5/1947 | Trautvetter | 52/180 |
| 2,781,703 | 2/1957 | Nagin | 52/180 |
| 3,093,216 | 6/1963 | Dunham | 52/180 |
| 3,181,440 | 5/1965 | Mullaney | 52/180 X |
| D183,691 | 10/1958 | Grover | 52/180 X |

*Primary Examiner*—Nile C. Byers
*Attorney, Agent, or Firm*—Bucknam and Archer

[57] ABSTRACT

A skid-proof gangway element in the form of a metal sheet having large holes with upwardly pressed edges and small holes arranged between the large holes and having downwardly pressed edges. The sheet material between the large holes is inclined toward the small holes so as to allow oil to be drained off. The upwardly pressed edges of the large holes provide skid-proof zones.

7 Claims, 3 Drawing Figures

GANGWAY ELEMENT

BACKGROUND OF THE INVENTION

The invention relates to a gangway element of the type comprising a substantially rectangular metal sheet with relatively large holes.

In a known gangway element formed as a grate, the individual ribs are constituted by iron strips, these strips being arranged very closely to each other so that their edges in combination may form a walking surface provided with holes. The holes of the walking surface correspond to the air gap between the individual strips. A person walking on the walking surface is only liable to skid in the longitudinal direction of the strips.

The object of the invention is to provide a gangway element having an absolutely skid-proof walking surface, that is, a surface which, regardless of the direction in which a shoe is passed over it, will offer very great resistance to skidding of the shoe.

SUMMARY OF THE INVENTION

The gangway element according to the invention is characterized in that the edges of the large holes are pressed up above the plane of the sheet to form skid-proof zones, the maximum dimension of said holes being small compared with the width of a shoe, the metal sheet also having relatively small holes arranged between the large holes and catching and draining off oil, water or similar liquids that are likely to cause skidding, the sheet material between the large holes everywhere being inclined toward the small holes. The edges 3 of the large holes 2 are oblique with respect to the plane of the metal sheet and merge with the edges 5 of the small holes 4, which are also oblique with respect to the plane of the sheet, as shown in FIG. 2. When a person is walking on such an element, the raised edges of the large holes will prevent his shoes from sliding or skidding, regardless of the direction in which the shoe is passed along the surface. Substantial resistance to skidding is furthermore ensured thereby that any oil or other lubricant present will not accumulate between these holes but be drained off through the small holes.

According to the invention, the edges of the small holes may be pressed down beneath the plane of the sheet so as to form small funnels. As a result, any liquid liable to cause skidding may be drained off very efficiently.

Furthermore, according to the invention, the great and the small holes may be substantially circular thus permitting of manufacture by using relatively simple tools.

According to the invention, the centers of the large holes may be placed at the vertices and at the intersections of the diagonals of rectangles arranged in a pattern, the centers of the small holes being placed at the centers of the sides of the rectangles. As a result, the small holes, although penetrating the sheet, will not seriously reduce the regidity of the element.

Moreover, according to the invention, the metal sheet may be of channel section form, the holes being formed in the largest flange that serves as walking surface. As a result, the flexural strength of the element will be very great.

According to the invention, the channel section may have the form of an inverted "U". As a result, the elements may readily be arranged side by side, the "bottom" of the U forming a walking surface provided with holes, whereas the vertical flanges afford ready possibility of attaching the elements to one another. Also according to the invention, such attaching may be bolting, welding or clamping by means of clamping members. Spacing members may possibly be arranged between the elements.

Finally, according to the invention, the side flanges of the element may be provided with holes through which may be passed connecting bolts. As a result, the elements may readily be attached to one another by means of bolts and nuts.

DESCRIPTION OF THE DRAWINGS

The invention will be described below with reference to the accompanying drawings, in which.

DESCRIPTION OF THE PREFERRED EMBODIMENTS

Figure 1:
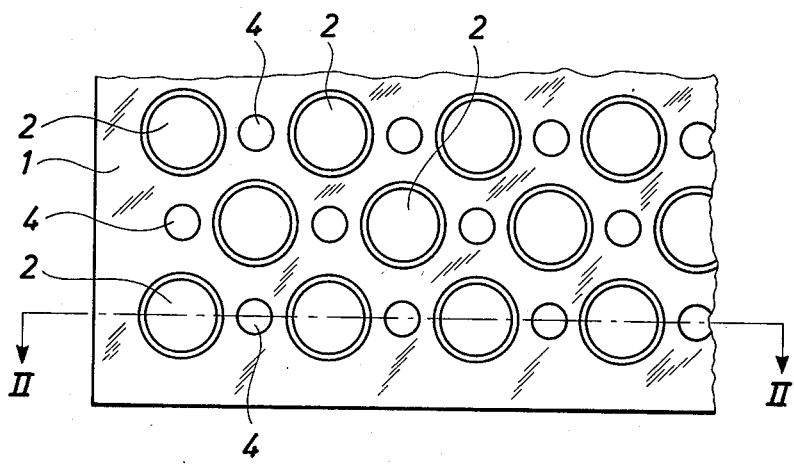
FIG. 1 is a plan view of a gangway element according to the invention formed as a plate, part of which has been removed.

The gangway element shown in FIG. 1 is constituted by a metal sheet 1 provided with large holes 2. For the sake of clarity, only some of the holes are marked, said holes being of a diameter which is small compared with the width of a shoe. The holes 2 have edges 3, which are bent up above the level of the sheet. Between the large holes 2 are small holes 4, a few of which only are marked with reference numerals. The edges 5 of the holes 4 are bent downwards in relation to the level of the sheet 1 so as to form small funnels of conical shape. Since the sheet material between the large holes is inclined toward the small holes, oil or other greasy liquid dropped on the element will not accumulate between the large holes, but run away through the funnels and thus be drained from the element. The edges 3 of the large holes 2 will always prevent shoes or similar objects contacting the element from skidding.

Figure 2:
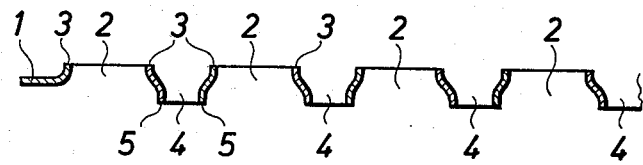
FIG. 2 is a section taken on the line I—I of FIG. 1

In the element shown in FIGS. 1 and 2 the small holes are at first punched in the sheet 1, and then the large holes. The sheet is then mounted in a press tool having mandrels of a diameter slightly larger than the diameter of the punched small holes, and subsequently the edges of the holes are drawn up around the mandrels. The small holes now have their finished shape. The sheet is thereafter mounted on a press tool having mandrels of a diameter slightly larger than the diameter of the large holes, after which the edges of the large holes are drawn up around the corresponding large mandrels. The edges 3 of the holes 2 are drawn up on that side of the sheet which is opposite the raised edges 5.

Figure 3:
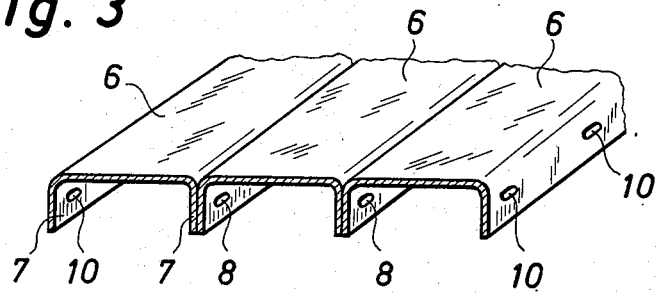
FIG. 3 is a perspective view of a gangway according to the invention, consisting of three gangway elements, each having U cross section.

The gangway element according to the invention may as mentioned above be formed as a U-channel section. Three such channel sections bolted together are shown in FIG. 3. As will appear from the Figure, the "bottom" of the U-channel section is formed as a walking surface. The upwardly projecting frictional edges 3 of the channel section (cf. FIG. 2) are omitted for the sake of clarity. The vertical flanges 7 of the channel sections are bolted together in pairs by means of bolts 8 and nuts. The holes 10 through which the bolts 8 are passed are oblong to permit displacement of the gangway elements in longitudinal direction in relation to one another.

When the gangway channel sections are manufactured, the frictional holes 2 and the outlet holes 4 are at first made in a wholly flat metal sheet. When these holes have been made, the holes 10 are punched after which the edge zones of the sheet in which the holes 10 are located are bent through 90° so that the sheet obtains a section of U-form with a horizontal flange 6 and vertical flanges 7 as illustrated in FIG. 3.

If the channel sections are to be of exceptional strength, they may be closed.

The gangway elements may be of any arbitrary length, but the length will normally be limited by the tools used for the manufacture of the elements and by their weight, since the gangway elements may be of a self-weight making them easy to move.

The large holes 2 and the small holes 4 are of a substantially circular form, cf. FIG. 1.

As indicated in FIG. 1, the centers of the large holes 2 are placed at the vertices of rectangles as well as at the intersections of the diagonals of such rectangles, the rectangles forming a lattice. The centers of the small holes 4 are placed at the centers of the side of said rectangles.

The embodiments disclosed in the foregoing do not serve to restrict the scope of the protection, but only to illustrate the invention.

What I claim is:

1. A gangway element of improved skid-proof properties, comprising a metal sheet having rows of large holes and small holes alternately, the size of the large holes being less than the width of the shoe of a person walking on said gangway, the holes in adjacent rows being out of registry so that each large hole is in alignment with a small hole of the adjacent rows, the edges of the large holes and the small holes being oblique with respect to the plane of the sheet, the edges of the large holes being pressed upwardly, the edges of the small holes being pressed downwardly, the edges of the larger holes merging with the edges of the small holes, whereby all the portions between the holes are inclined towards the small holes.

2. A plurality of elements according to claim 1 fastened to each other by conventional means.

3. A plurality of elements according to claim 1 arranged side by side and connected by spacing members.

4. A gangway element as claimed in claim 1 wherein the large holes and the small holes are substantially circular.

5. A gangway element as claimed in claim 1 wherein the centers of the large holes are placed at the vertices and at the intersections of the diagonals of rectangles arranged in a pattern, the centers of the small holes being placed at the centers of the sides of the rectangles.

6. A gangway element as claimed in claim 1 wherein the metal sheet is formed as a channel the holes being formed in the largest flange of the channel that serves as a walking surface.

7. A gangway element as claimed in claim 6 wherein the channel section has the form of an inverted U.

* * * * *